United States Patent
De Léon et al.

(10) Patent No.: US 9,510,197 B2
(45) Date of Patent: Nov. 29, 2016

(54) ELECTRONIC EQUIPMENT AND METHOD OF AUTHENTICATING A USER

(71) Applicant: Sony Corporation, Tokyo (JP)

(72) Inventors: David De Léon, Lund (SE); Alexander Hunt, Tygelsjö (SE); Ola Thörn, Limhamn (SE); Magnus Midholt, Lund (SE); Lars Nord, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 181 days.

(21) Appl. No.: 14/302,456

(22) Filed: Jun. 12, 2014

(65) Prior Publication Data

US 2015/0365825 A1 Dec. 17, 2015

(51) Int. Cl.

| | |
|---|---|
| *H04W 12/06* | (2009.01) |
| *G06F 3/01* | (2006.01) |
| *G06F 21/32* | (2013.01) |
| *G06F 21/35* | (2013.01) |
| *H04L 29/06* | (2006.01) |

(52) U.S. Cl.
CPC ............. *H04W 12/06* (2013.01); *G06F 3/011* (2013.01); *G06F 21/32* (2013.01); *G06F 21/35* (2013.01); *H04L 63/08* (2013.01)

(58) Field of Classification Search
CPC ...... H04W 12/06; G06F 3/011; G06F 21/32; G06F 21/35
See application file for complete search history.

(56) References Cited

U.S. PATENT DOCUMENTS

| 8,049,597 B1* | 11/2011 | Murakami | G06F 21/32 340/5.1 |
|---|---|---|---|
| 2010/0263031 A1* | 10/2010 | Tsuchiya | G06F 21/32 726/7 |
| 2014/0089672 A1 | 3/2014 | Luna et al. | |
| 2015/0135310 A1* | 5/2015 | Lee | A61B 5/681 726/20 |
| 2015/0235227 A1* | 8/2015 | Lee | G06Q 20/3227 705/44 |

FOREIGN PATENT DOCUMENTS

| EP | 1914656 | 4/2008 |
|---|---|---|
| EP | 2378748 | 10/2011 |
| EP | 2720444 | 4/2014 |
| WO | 2011034831 | 3/2011 |

OTHER PUBLICATIONS

Harrison, Chris et al., "Capacitive Fingerprinting: Exploring User Differentiation by Sensing Electrical Properties of the Human Body", Oct. 2012.
Sato, Munehiko et al., "Touche: Enhancing Touch Interaction on Humans, Screens, Liquids, and Everyday Objects", May 2012.
International Search Report for corresponding International Application No. PCT/EP2014/76979 mailed Mar. 4, 2015.

\* cited by examiner

*Primary Examiner* — Leon Flores
(74) *Attorney, Agent, or Firm* — Renner, Otto, Boisselle & Sklar, LLP.

(57) ABSTRACT

An electronic equipment comprises a sensor circuit operative to measure at least one electrical property of a user at a plurality of frequencies to thereby capture frequency-resolved electrical characteristics of the user. The electronic equipment comprises a processing circuit operative to perform a comparison between the frequency-resolved electrical characteristics of the user and reference characteristics to authenticate the user. The processing circuit is operative to perform an unlocking operation based on a result of the comparison.

18 Claims, 8 Drawing Sheets

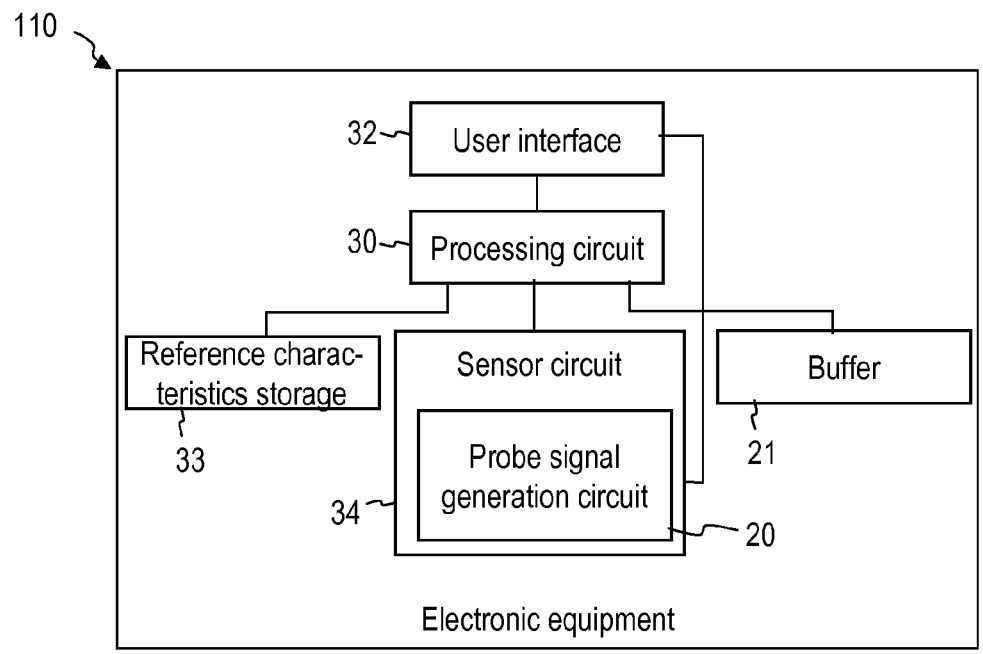
FIG. 12
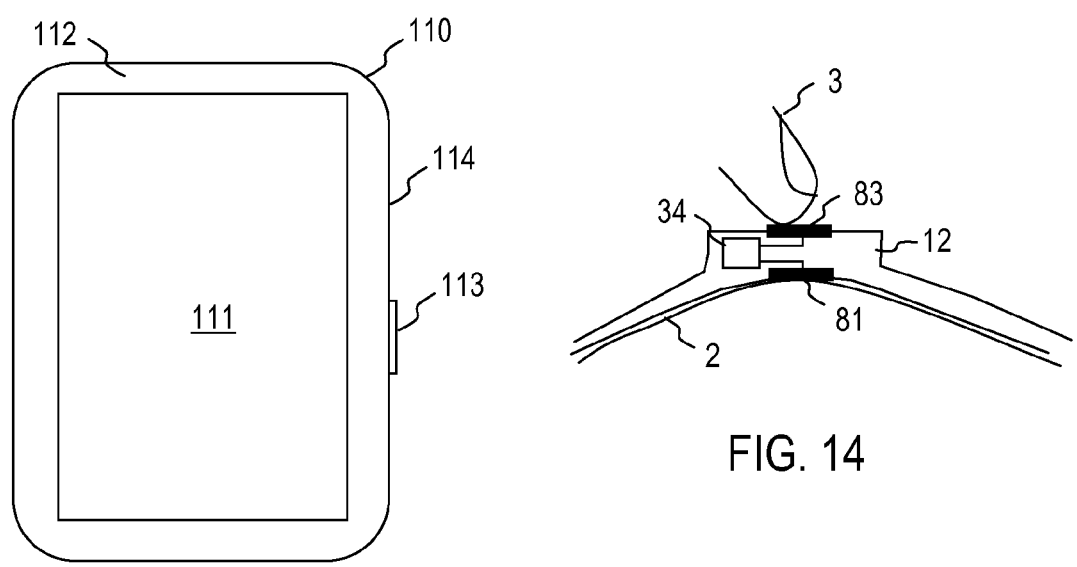
FIG. 13
FIG. 14

ELECTRONIC EQUIPMENT AND METHOD OF AUTHENTICATING A USER

FIELD OF THE INVENTION

Embodiments of the invention relate to an electronic equipment and authentication methods. Embodiments of the invention relate in particular to an electronic equipment and method which allows a user to be authenticated for using the electronic equipment.

BACKGROUND OF THE INVENTION

Electronic equipments which have security mechanisms for preventing unauthorized use continue to become increasingly popular. Examples for such electronic equipments include, without limitation, terminals for cellular communication systems, portable computing devices, or other equipments.

Security and the prevention of unauthorized use of such electronic equipments receive significant attention and may affect end-users to take action in different ways to protect themselves against unauthorized usage of their electronic equipment. One exemplary mechanism includes passwords. However, it may be cumbersome for the user to remember a password. Authentication may also be time consuming, because the user has to enter the password. Optical scanners or other optical sensors which capture an image of a finger or of an iris may also considerably add to the complexity and time delay before the user can start using the electronic equipment. Further, such optical scanners may considerably add to the costs of the electronic equipment.

BRIEF SUMMARY OF THE INVENTION

There is a need in the art for electronic equipments and for methods of authenticating a user by which a user can be easily authenticated in a manner which increases user convenience. There is a need for such electronic equipments and methods which allow an authentication to be performed without requiring significant user actions and without incurring a significant time delay before the user can start using the electronic equipment when the electronic equipment is in a locked state, for example.

According to embodiments, electrical sensing techniques are used to determine a footprint for the user which represents electrical characteristics of the user. The electrical characteristics may include capacitance, inductivity, and/or impedance, respectively measured at a plurality of frequencies. The footprint which represents electrical characteristics of the user may be used to authenticate the user. According to embodiments, capacitive sensing and/or inductive sensing and/or impedance sensing may be used to determine the electrical characteristics of the user.

In order to register a user which is authorized to use the device, the electrical characteristics may be captured by capacitive sensing and/or inductive sensing and/or impedance sensing, and may be stored as reference characteristics in a non-volatile manner. Subsequently, in order to determine whether a user is authorized to use the electronic equipment, the electrical characteristics of the user are measured by capacitive sensing and/or inductive sensing and/or impedance sensing and are compared to the reference characteristics.

The reference characteristics may be stored for several relative positions between the electronic equipment and the user. For illustration, the reference characteristics may include both frequency-dependent data for the case when the user holds a mobile device in a hand of an arm on which a wearable device is mounted and other frequency-dependent data for the case when the user holds the mobile device in a hand of an arm different from the arm on which the wearable device is mounted.

An unlocking operation may be performed when it is detected, based on the captured electrical characteristics, that the user is authorized to use the electronic equipment. The unlocking operation may unlock a user interface. The unlocking operation may unlock a lock screen of a terminal of a cellular communication network.

By sensing electrical characteristics of the user and using the electrical characteristics as a sort of footprint upon which an authentication may be based, the user may be authenticated in an automatic and efficient way.

An electronic equipment according to an embodiment comprises a sensor circuit operative to measure at least one electrical property of a user at a plurality of frequencies to thereby capture frequency-resolved electrical characteristics of the user. The portable electronic equipment comprises a processing circuit operative to perform a comparison between the frequency-resolved electrical characteristics of the user and reference characteristics to authenticate the user. The processing device is configured to perform an unlocking operation based on a result of the comparison.

The electronic equipment may be formed by at least two separate components. The two separate components may include a wearable device and a mobile device which is separate from the wearable device. The mobile device may be a terminal of a cellular communication network. The wearable device may be configured for attachment to the user's skin. The wearable device may be configured for attachment to a wrist, arm, head or other portions of a body of the user.

The sensor circuit may be mounted in the wearable device.

A probe signal generation circuit configured to generate the probe signal may be mounted in the wearable device. The sensor circuit may be configured to measure a response to the probe signal to capture the frequency-resolved electrical characteristics.

The electronic equipment may comprise a user interface which is separate from the wearable device and configured to communicate with the wearable device over a wireless interface. The processing device may be configured to selectively unlock the user interface based on the result of the comparison to perform the unlocking operation.

The electronic equipment may be configured to trigger the sensor circuit to capture the frequency-resolved electrical characteristics of the user when a housing accommodating the user interface is held in a hand of the user.

The electronic equipment may be configured to trigger the probe signal generation circuit to generate the probe signal when a housing accommodating the user interface is held in a hand of the user.

The processing circuit may be mounted in the wearable device. The processing circuit may be configured to transmit an unlocking signal to unlock the user interface over a wireless interface of the wearable device.

The electronic equipment may comprise a buffer operative to buffer the frequency-resolved electrical characteristics of the user in the wearable device. The frequency-resolved electrical characteristics of the user may be captured even before the user picks up the mobile device for unlocking it.

The wearable device may be operative to use the buffered frequency-resolved electrical characteristics of the user to authenticate the user.

The processing circuit may be configured to transmit a result of the comparison over a wireless interface. The captured electrical characteristics may not be transmitted over the wireless interface to prevent fraudulent manipulation.

The electronic equipment may be a mobile device which comprises a housing in which a user interface, the sensor circuit and the processing circuit are accommodated.

The user interface may be arranged on a first side of the housing and the sensor circuit may comprise a conductive surface located at a second side of the housing, the second side being different from the first side.

The sensor circuit may be coupled to the user interface for establishing a closed current loop for capturing the electrical characteristics of the user.

The electronic equipment may be configured to capture the reference characteristics in a registration phase in which the sensor circuit measures the at least one electrical property of the user at the plurality of frequencies.

The electronic equipment may be configured to capture the reference characteristics for respectively each one of a plurality of different positions of the electronic equipment relative to the user. The user may be authenticated when the captured frequency-resolved electrical characteristics match any one of the reference characteristics for the plurality of different orientations.

The sensor circuit may be operative to generate a probe signal which comprises a plurality of spectral components oscillating at different frequencies. The sensor circuit may be operative to apply the probe signal to the user. The sensor circuit may be operative to measure a response signal when the probe signal is applied to the user.

The sensor circuit may be operative to measure a response to a probe signal which is applied to the user and which comprises a plurality of spectral components oscillating at different frequencies.

The sensor circuit may be configured to perform a frequency sweep. The sensor circuit may be configured to perform a frequency sweep to generate the probe signal.

The sensor circuit may be configured to perform a swept frequency capacitive sensing (SFCS) to capture the frequency-resolved electrical characteristics of the user.

The sensor circuit may be configured to perform an impedance sensing to capture the frequency-resolved electrical characteristics of the user.

A method of authenticating a user of an electronic equipment comprises measuring, by a sensor circuit, at least one electrical property of a user at a plurality of frequencies to thereby capture frequency-resolved electrical characteristics of the user. The method comprises performing, by a processing circuit, a comparison between the frequency-resolved electrical characteristics of the user and reference characteristics to authenticate the user. The method comprises selectively performing an unlocking operation based on a result of the comparison The sensor circuit may be mounted in a wearable device.

A probe signal generation circuit configured to generate a probe signal may be mounted in the wearable device. The probe signal generation circuit may be configured to generate the probe signal as a swept frequency signal.

The method may comprise receiving a trigger signal for generating the probe signal at the wearable device over a wireless interface. The method may comprise transmitting the result of the comparison from the wearable device to a mobile device over a wireless interface.

The method may comprise capturing, by the sensor circuit, the reference characteristics in a registration phase for subsequent use in authenticating the user.

Capturing the reference characteristics in the registration phase may comprise capturing the reference characteristics for at least two different positions of the electronic equipment relative to the user.

Measuring the at least one electrical property of the user may comprise generating, by the sensor circuit, a probe signal using a frequency sweep.

Measuring the at least one electrical property of the user may comprise performing, by the sensor circuit, a swept frequency capacitive sensing (SFCS) to capture the frequency-resolved electrical characteristics of the user.

Measuring the at least one electrical property of the user may comprise performing, by the sensor circuit, an impedance sensing to capture the frequency-resolved electrical characteristics of the user.

Devices and methods according to embodiments allow a mobile device to be unlocked by authenticating a user based on electrical characteristics. The electrical characteristics may be frequency-resolved, thereby providing a plurality of data points in the frequency domain. The electrical characteristics may be captured using a sensor circuit in the mobile device itself or in a wearable device remote from the mobile device. When the sensor circuit is installed in the wearable device, wireless communication between the wearable device and the mobile device may be performed using Bluetooth Low Energy (BLE), WiFi, body area network (BAN) or other wireless communication techniques.

BRIEF DESCRIPTION OF THE DRAWINGS

Embodiments of the invention will be described with reference to the accompanying drawings in which the same or similar reference numerals designate the same or similar elements.

FIG. 12 is a block diagram of an electronic equipment according to an embodiment.

FIG. 13 is a plan view of the electronic equipment of FIG. 12.

FIG. 14 is a cross-sectional view of a wearable device of an electronic equipment according to an embodiment.

DESCRIPTION OF EMBODIMENTS

Exemplary embodiments of the invention will be described with reference to the drawings. While some embodiments will be described in the context of specific fields of application, e.g. in the context of electronic equipments which comprise a wearable device and a mobile device separate therefrom, the embodiments are not limited to these configurations. The features of the various embodiments may be combined with each other unless specifically stated otherwise.

Figure 1:
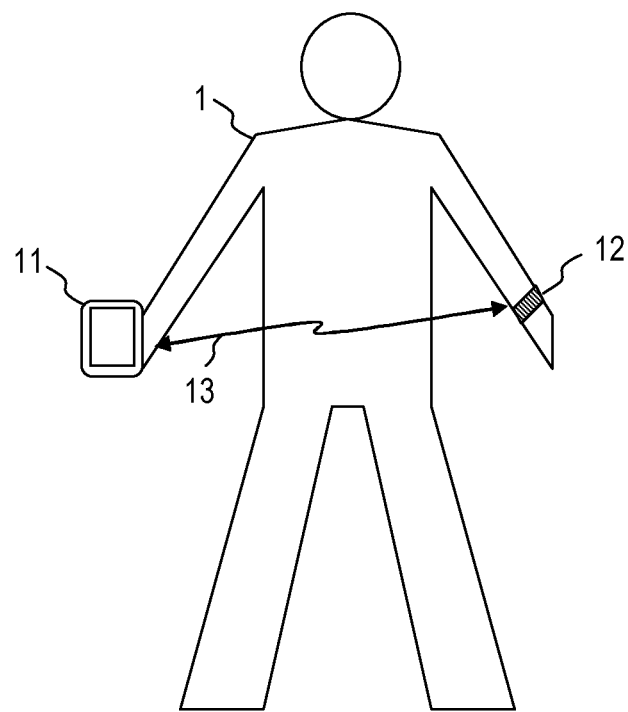
FIG. 1 is a schematic view of an electronic equipment according to an embodiment.
Figure 2:
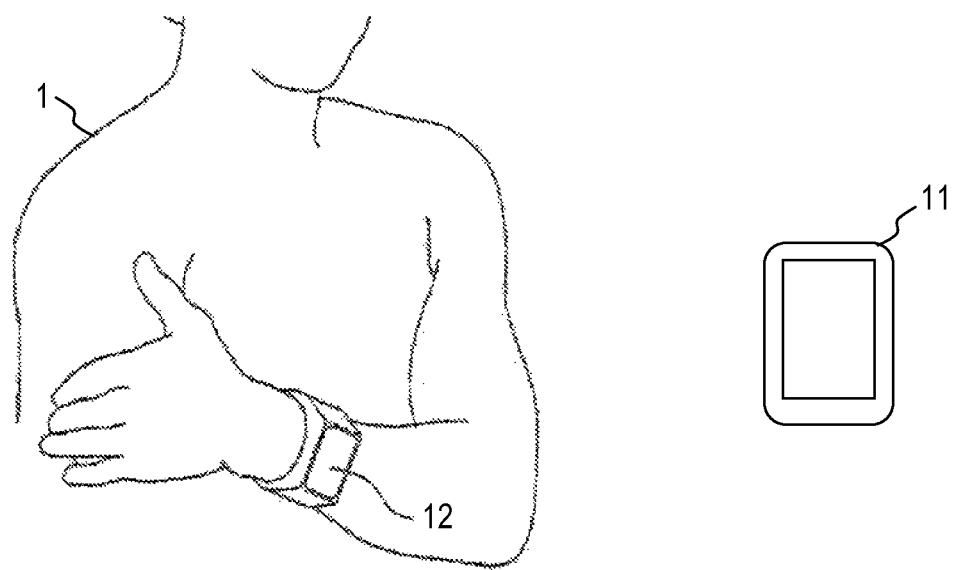
FIG. 2 is an enlarged view of the electronic equipment according to an embodiment.

FIG. 1 is a schematic view of an electronic equipment according to an embodiment. FIG. 2 is a perspective detail view of the electronic equipment. The electronic equipment includes a mobile device 11 and a wearable device 12. The mobile device 11 may be a portable device. The mobile device 11 may be a handheld device. The mobile device 11 may be a terminal configured for communication with a cellular communication network, e.g. a mobile phone, tablet, or laptop.

The mobile device 11 has different operating states including a locked state. In the locked state, a user is prevented from using at least some of the functions. In the locked state, a user interface of the mobile device 11 may prevent the user from activating at least some functions. For illustration, the user interface of the mobile device 11 may show a lock screen, and the mobile device 11 must be unlocked before the user can cause the mobile device 11 to perform data or voice communication functions, for example.

The electronic equipment comprises a sensor circuit. The sensor circuit may be installed in the wearable device 12 which is separate from the mobile device 11, as will be explained in more detail with reference to FIG. 14 and FIG. 15 below. The sensor circuit may also be integrated in the mobile device 11.

The sensor circuit is configured to measure at least one electrical property of the user 1. The at least one electrical property may be a capacitive value and/or an impedance and/or an inductivity. The sensor circuit may be configured to measure the at least one electrical property for respectively each one of a plurality of frequencies. Electrical properties of dielectric material, such as body tissue, may exhibit a frequency-dependence. By measuring the at least one electrical property of the user 1 for respectively each one of a plurality of frequencies, the sensor circuit may capture electrical characteristics of the user in a frequency-resolved manner. The capacitive values, impedance values, and/or inductivity values measured for each one of a plurality of frequencies are collectively referred to as "frequency-resolved electrical characteristics" of the user herein.

The frequency-resolved electrical characteristics measured by the sensor circuit are used by the electronic equipment to authenticate the user. In order to register a user as an admissible user of the electronic equipment, the sensor circuit may capture the frequency-resolved electrical characteristics of the user. The sensor circuit may perform a capacitive sensing and/or an inductive sensing and/or an impedance sensing to capture the frequency-resolved electrical characteristics of the user. The frequency-resolved electrical characteristics of the user and/or data generated by processing the frequency-resolved electrical characteristics may be stored in a non-volatile memory. The frequency-resolved electrical characteristics of the user and/or the data generated by processing the frequency-resolved electrical characteristics may serve as reference characteristics when the user needs to be authenticated again. The reference characteristics may be stored in the mobile device 11 and/or the wearable device 12.

The frequency-resolved electrical characteristics may depend on how the user holds or mounts components of the electronic equipment. For illustration, the frequency-resolved electrical characteristics may depend on whether the mobile device 11 is held in a hand of an arm on which the wearable device 12 is mounted or in a hand of the other arm. To take this into account, reference characteristics may be stored in the electronic equipment for a plurality of different positions between the electronic equipment and the user. The respective reference characteristics may be captured in a registration phase.

When the mobile device 11 is in a locked state, the sensor circuit may capture the frequency-resolved electrical characteristics of the user wearing the wearable device 12. The captured frequency-resolved electrical characteristics of the user may be compared to the reference characteristics stored in the electronic equipment to authenticate the user. The mobile device 11 may be selectively unlocked if the captured frequency-resolved electrical characteristics of the user matches the previously stored reference characteristics.

The electronic equipment may be configured to adapt the reference characteristics. For illustration, the response of a dielectric material such as the user's body may vary with time as the body constitution changes. This may happen when the user grows, puts on weight or looses weight. The electronic equipment may be operative to track changes in the frequency-resolved electrical characteristics of the user. The electronic equipment may be operative to gradually adapt the reference characteristics when it monitors consistent, gradual changes in the frequency-resolved electrical characteristics of the user, without requiring the user to perform a new registration phase.

The electronic equipment may be configured to detect that the frequency-resolved electrical characteristics still match the reference characteristics, even though they do not completely coincide. A metric quantifying the difference between the frequency-resolved electrical characteristics and the reference characteristics may be used to detect that there is a deviation, but the match is still good enough to reliably authenticate the user. The metric may be a distance metric in frequency space, for example. When the electronic equipment detects that the frequency-resolved electrical characteristics deviate from the stored reference characteristics in a systematic manner, e.g. because the frequency-resolved electrical characteristics show consistent deviations from the previously recorded reference characteristics as the user is authenticated a number of times, the reference characteristics may be adapted. The adaptation may involve computing a weighted average of the stored reference characteristics and the frequency-resolved electrical characteristics captured when the user is authenticated based on the electrical footprint.

It is also possible that several users are registered as authorized users with the mobile device 11. The frequency-resolved electrical characteristics and/or the data generated by processing the frequency-resolved electrical characteristics may be stored in the non-volatile memory for each one of the several registered users. The mobile device 11 may be unlocked based on the electrical characteristics captured for a user if the electrical characteristics match one of the several stored frequency-resolved electrical characteristics.

If an authentication based on the electrical characteristics is successful for a user, the unlocking may be performed based on the captured electrical characteristics without requiring the user to input a password. If the authentication based on the electrical characteristics is unsuccessful for a user, other authentication techniques may still be used, e.g. by requesting the user to enter a password. It is also possible to combine the authentication based on the electrical characteristics with other authentication techniques for enhanced security. The risk of an unauthorized usage of the electronic equipment may be reduced thereby.

A verification whether a user is authorized to use the mobile device 11 may be performed in various ways. The mobile device 11 may detect that it is picked up or otherwise held in a hand of a user. The mobile device 11 may then trigger the sensor circuit to measure the at least one electrical property for each one of a plurality of frequencies so as to capture the frequency-resolved electrical characteristics. The wearable device 12 may generate a probe signal. The probe signal may be a swept frequency signal. The sensor circuit may measure a response to the probe signal at the mobile device 11. The mobile device 11 may process the response to determine the frequency-resolved electrical characteristics, e.g. by deriving a capacitance value, an impedance value, and/or an inductivity value for respectively each one of several frequencies. The mobile device 11 may determine based on a comparison of the frequency-resolved electrical characteristics to the reference characteristics whether the mobile device 11 is to be unlocked.

To further reduce the time required for unlocking the mobile device 11, the sensor circuit may be configured such that it captures the frequency-resolved electrical characteristics automatically, e.g. in pre-defined time intervals. To this end, the mobile device 11 and the wearable device 12 may synchronize over a wireless interface and the mobile device 11 may cause the wearable device 12 to generate the probe signal. The sensor circuit may buffer the frequency-resolved electrical characteristics. When the mobile device 11 detects that it is picked up or otherwise held in a hand of a user, the mobile device 11 may trigger the wearable device 12 to transmit the frequency-resolved electrical characteristics to the mobile device 11.

A data transmission 13 between the wearable device 12 and the mobile device 11 may be implemented in various ways. The data transmission 13 may be performed using Bluetooth Low Energy (BLE), WiFi, body area network (BAN) or other wireless communication techniques.

Figure 3:
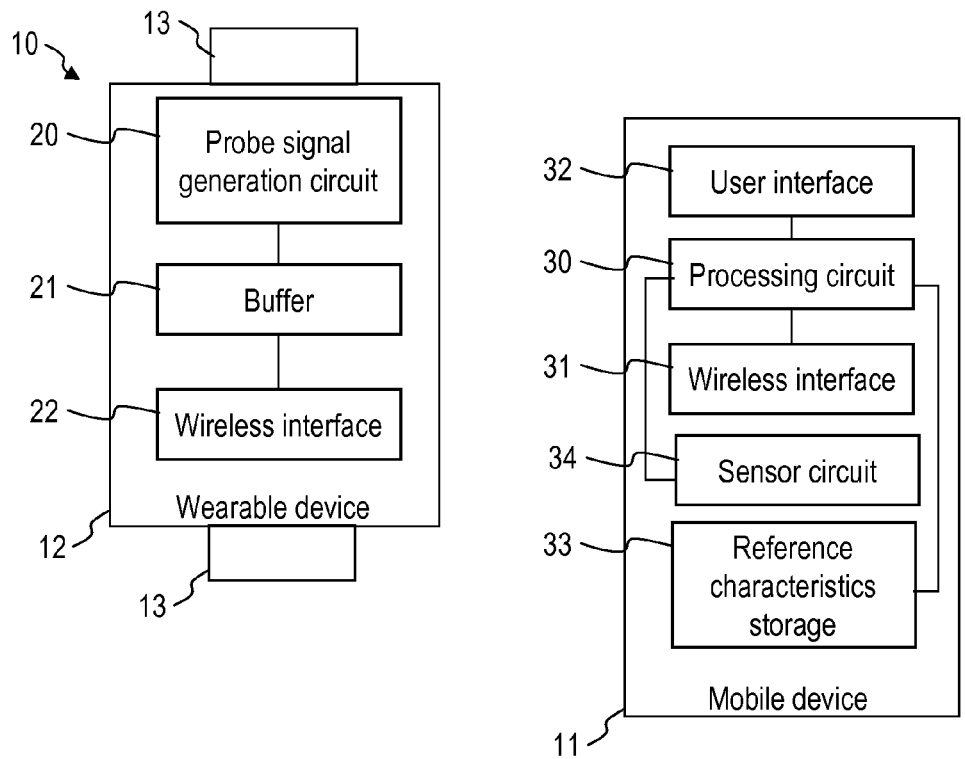
FIG. 3 is a block diagram of an electronic equipment according to an embodiment.

FIG. 3 is a block diagram representation of an electronic equipment 10 according to an embodiment. The electronic equipment 10 comprises the mobile device 11 and the wearable device 12.

The mobile device 11 comprises a processing circuit 30. The processing circuit 30 may be configured to perform an authentication of a user based on the frequency-resolved electrical characteristics captured by a sensor circuit 34. The processing circuit 30 may be configured to retrieve the frequency-resolved electrical characteristics captured by the sensor circuit 34 in response to a probe signal. The probe signal may be generated and applied to a user by a probe signal generation circuit 20 included in the wearable device 12. The processing circuit 30 may trigger the probe signal generation circuit 20 to generate the probe signal by communication over a wireless interface 31. The wireless interface 31 may be configured for communication with a wireless interface 22 of the wearable device 12 in accordance with Bluetooth Low Energy (BLE), WiFi, body area network (BAN) or other wireless communication techniques. A synchronization between the mobile device 11 and the wearable device 12 may also be performed over the wireless interfaces 31, 22.

The processing circuit 30 may compare the frequency-resolved electrical characteristics captured by the sensor circuit 34 and reference characteristics stored in a storage device 33. The reference characteristics may be stored in the storage device 33 when a user is registered as authorized user for the mobile device 11, as described above. The processing circuit 30 may perform any one or any combination of techniques to compare the captured frequency-resolved electrical characteristics to the reference characteristics stored in the storage device 33. For illustration, one or several electrical properties, e.g. capacitive values, inductive values, and/or impedance values, recorded at several frequencies may be compared to the reference characteristics. Alternatively or additionally, spectral analysis techniques may be performed to determine whether the locations and/or heights of peaks in the captured frequency-resolved electrical characteristics match those in the stored reference characteristics. Alternatively or additionally, statistical techniques such as main component analysis may be performed by the processing circuit 30 to determine whether the captured frequency-resolved electrical characteristics of the user match those of a previously registered user. The processing circuit 30 may perform digital data processing to compare the captured frequency-resolved electrical characteristics and the reference characteristics. The processing circuit 30 may comprise one or several processors, one or several microprocessors, one or several controllers, one or several microcontrollers, one or several application specific circuits or a combination thereof to perform the indicated functions.

The reference characteristics stored in the storage device 33 may include several data sets for one user. For illustration, one data set of the reference characteristics may define the frequency-resolved electrical characteristics captured in a registration phase when the mobile device 11 and the wearable device 12 are in contact with the same arm of the user. Another data set of the reference characteristics may define the frequency-resolved electrical characteristics captured in the registration phase when the mobile device 11 and the wearable device 12 are in contact with different arms of the user. As discussed above, the mobile device 11 may be configured to gradually adapt the stored reference characteristics. The mobile device 11 may automatically adapt the stored reference characteristics when it detects consistent deviations in the captured frequency-resolved electrical characteristics from the stored reference characteristics.

The mobile device 11 may comprise a user interface 32. The user interface 32 may be a combined input/output interface, e.g. a touch-sensitive screen. The user interface 32 may have a locked state in which it may allow the user to perform only some functions, while other functions of the mobile device 11 are locked. For illustration, in the locked state, the user interface 32 may allow the user to enter a password, to initiate an emergency communication, and/or to shut down the mobile device. The user interface 32 may not allow the user to initiate non-emergency voice or data communication in the locked state.

The processing circuit 30 may perform an unlocking operation based on the comparison of the captured frequency-resolved electrical characteristics and the reference characteristics of registered user(s). The processing circuit 30 may unlock the user interface 32 such that it allows a greater number of functions to be performed by the mobile device than in the locked state, if the captured frequency-resolved electrical characteristics of the user matches the reference characteristics stored in the storage device 33.

The wearable device 12 may have an attachment feature 13 for attaching the wearable device 12 to the body of the user such that it abuts on a skin of the user. The attachment feature 13 may be a strap, e.g. a wrist strap or a breast strap. The probe signal generation circuit 20 may be integrated in the wearable device 12. The probe signal generation circuit 20 may be configured to generate a probe signal. The probe signal generation circuit 20 may be configured to generate the probe signal with a frequency sweep, such that the probe signal includes spectral components of a plurality of different frequencies.

The sensor circuit 34 in the mobile device 11 may have a detector for detecting a response signal measured in response to applying the probe signal to the body of the user 1. The sensor circuit 34 may be configured to determine a capacitance value and/or an impedance value and/or an inductivity value for each one of plural frequencies. A synchronization for synchronizing a frequency sweep of the probe signal generation circuit 20 and of analysis of the response by the sensor circuit 34 may be performed by synchronization over the wireless interfaces 31, 22. The wireless interface 22 may be configured for communication with the wireless interface 31 of the mobile device 11 in accordance with Bluetooth Low Energy (BLE), WiFi, body area network (BAN) or other wireless communication techniques.

The wearable device 12 may be configured to receive a request for generating the probe signal from the mobile device 11. In response to the request the wearable device 12 may generate the probe signal. Alternatively or additionally, the wearable device 12 may be configured such that the probe signal generation circuit 20 generates the probe signal even before from the user picks up the mobile device 11. The sensor circuit 34 may capture the frequency-dependent electrical characteristics in pre-defined, short time intervals, for example, and the probe signal generation circuit 20 may respectively generate the probe signals for the measurement. The latest frequency-dependent electrical characteristics may be buffered in a buffer. The buffer may be included in the mobile device. When an authentication is required for unlocking the user interface 32, the latest frequency-dependent electrical characteristics may be retrieved from the buffer for authentication.

The probe signal generation circuit 20 and the sensor circuit 34 may have a variety of configurations. The probe signal generation circuit 20 and the sensor circuit 34 may be configured to perform a capacitive sensing to capture capacitance values for several frequencies as electrical characteristics of the user, as will be explained in more detail with reference to FIG. 4. The sensor circuit 34 may additionally or alternatively be configured to capture impedance values for several frequencies as electrical characteristics of the user, as will be explained in more detail with reference to FIG. 5 and FIG. 6. The sensor circuit 34 may additionally or alternatively be configured to perform inductive sensing to capture inductive values.

Figure 4:
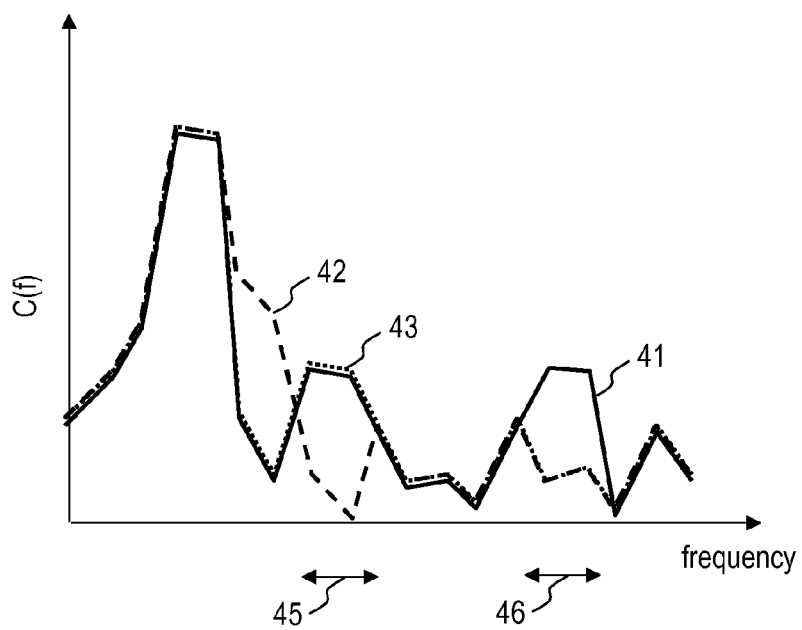
FIG. 4 is a diagram illustrating operation of an electronic equipment according to an embodiment which performs capacitive sensing in an authentication procedure.

FIG. 4 is a diagram which shows capacitance values measured by a sensor circuit 34 and processed by a processing circuit 30 of an electronic equipment according to an embodiment. The data which represent capacitive values versus frequency are examples for frequency-resolved electrical characteristics. Different curves 41-43, i.e., different frequency-resolved electrical characteristics are recorded for different users. This is due to the fact that the capacitive measurements are sensitive to tissue properties of body tissue, such as fat or water content, density, and size. The capacitance as a function of frequency, $C(f)$, may exhibit different behaviour for different users. Different users may be distinguished by the capacitance values measured for different frequencies.

It is not required that the electrical characteristics 41-43 can be distinguished at each one of several frequencies. For illustration, the difference between the capacitive value 41 of one user measured at frequencies in a frequency range 46 allows the user to be distinguished from one or several other users for which electrical characteristics 42, 43 are measured which differ from the electrical characteristics 41 in at least the frequency range 46. The difference between the capacitive value 42 of a further user measured at frequencies in a frequency range 45 allows the further user to be distinguished from one or several other users for which electrical characteristics 41, 43 are measured which differ from the electrical characteristics 42 in at least the frequency range 45.

The sensor circuit 34 may be configured to generate a probe signal which has spectral components at a plurality of frequencies. A frequency sweep may be performed. The sensor circuit 34 may monitor a response signal detected at the body of the user. The same electrode or different electrodes may be used for applying the probe signal to the user and for measuring the response signal. The electrode(s) may be provided at a rear side of the wearable device 12 which abuts on the skin, for example.

The sensor circuit 34 may be configured to perform a swept frequency capacitive sensing on the user. The sensor circuit 34 may be configured and may operate as described in C Harrison et al.: "Capacitive Fingerprinting: Exploring User Differentiation by Sensing Electrical Properties of the Human Body", UIST '12, Oct. 7-10, 2012, Cambridge, Mass., USA, which is incorporated herein by reference.

Impedance sensing and/or inductive sensing may be performed in addition or as an alternative to capacitive sensing, as will be explained in more detail with reference to FIG. 5 and FIG. 6.

Figure 5:
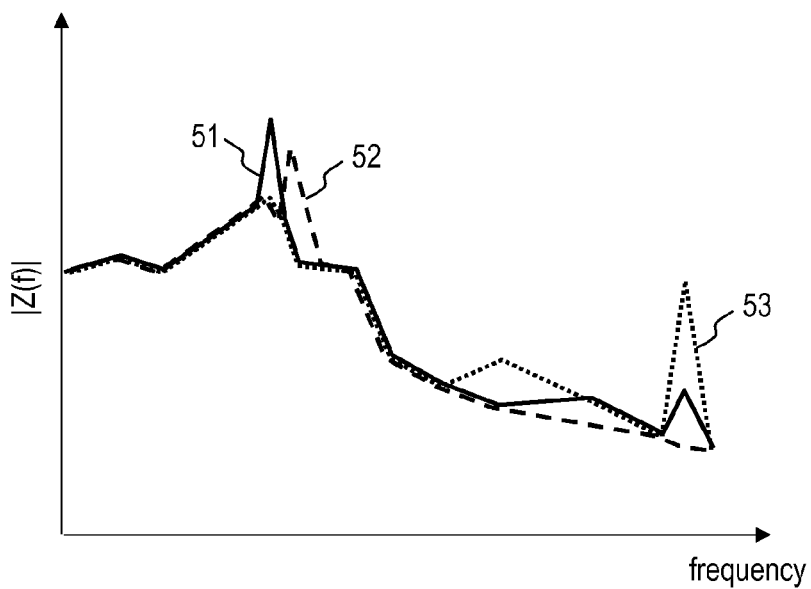
FIG. 5 is a diagram illustrating operation of an electronic equipment according to an embodiment which performs impedance sensing in an authentication procedure.
Figure 6:
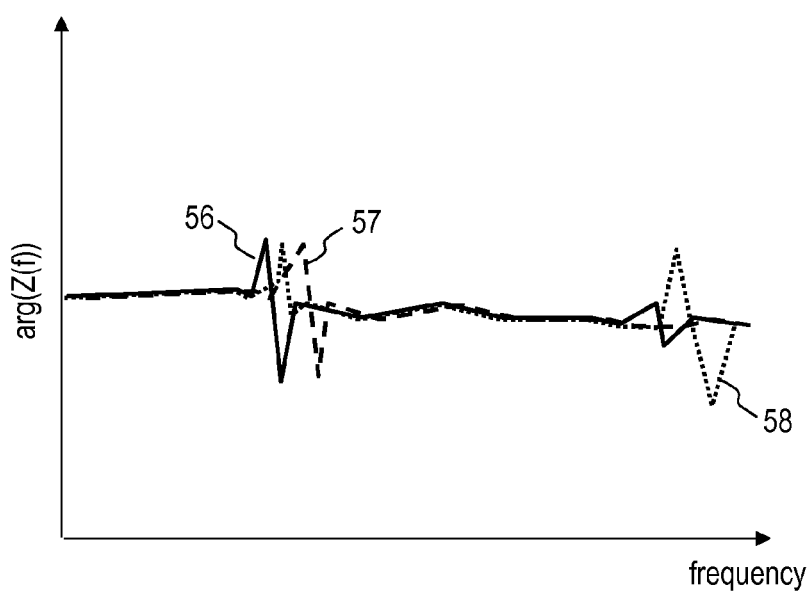
FIG. 6 is a diagram illustrating operation of an electronic equipment according to an embodiment which performs impedance sensing in an authentication procedure.

FIG. 5 is a diagram which shows a modulus of impedance values and FIG. 6 is a diagram which shows a complex argument (i.e. the phase) of impedance values measured by a sensor circuit 34 and processed by a processing circuit 30 of an electronic equipment according to an embodiment. The data which represent the modulus and complex argument of the impedance versus frequency are examples for frequency-resolved electrical characteristics. Different curves 51-53 representing the modulus of the impedance, i.e., different frequency-resolved electrical characteristics are recorded for different users. Different curves 56-58 representing the complex argument of the impedance, i.e., different frequency-resolved electrical characteristics are recorded for different users. This is due to the fact that the impedance measurements are sensitive to tissue properties of body tissue, such as fat or water content, density, and size. The modulus of the impedance as a function of frequency, $|Z(f)|$, and/or the argument of the impedance as a function of frequency, $\arg(Z(f))$, may exhibit different behaviour for different users. Different users may be distinguished by the impedance values measured for different frequencies.

By measuring the impedance e.g. at the user's hand or between the user's two hands using the sensing circuit, the user's tissue may be analyzed and this may be used as a footprint for authentication. For illustration, tissue which has little or no fat typically has a greater amount of water and acts as a better conductor than bone tissue or tissue which contains much fat.

Figure 7:
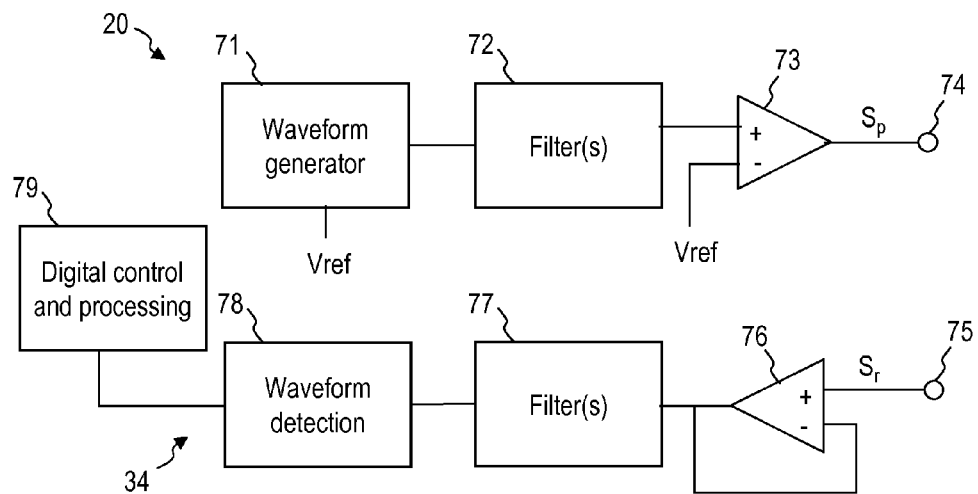
FIG. 7 shows a sensor circuit of an electronic equipment according to an embodiment.

FIG. 7 shows an implementation of a probe signal generation circuit 20 and a sensor circuit 34 which may be used in an electronic equipment according to an embodiment. The probe signal generation circuit 20 and the sensor circuit 34 may be mounted in different devices or in the same device. For illustration, the probe signal generation circuit 20 may be mounted in the wearable device 12 and the sensor circuit 34 may be mounted in the mobile device 11 or vice versa. In another embodiment, the probe signal generation circuit 20 and the sensor circuit 3 may both be mounted in a mobile device 11 or may both be mounted in a wearable device 12.

The probe signal generation circuit 20 may comprise a waveform generator 71. The waveform generator 71 may be configured to generate a signal which oscillates at more than one frequency. The waveform generator 71 may be configured to generate a signal which has a frequency which varies as a function of time. Such a signal may be written as $$s(t)=\cos(2\times\pi\times f(t)\times t+\phi), \tag{1}$$

where t denotes the time, f(t) the frequency which varies with time, and $\phi$ denotes a phase shift.

An output of the waveform generator 71 may be supplied to one or several filter(s) 72. The filter(s) 72 may comprise at least one high pass filter and at least one low pass filter. An output of the filter(s) may be supplied to an amplifier 73. An output of the amplifier 73 may be applied to the body of the user as a probe signal $S_p$. An output 74 of the probe signal generation circuit 20 may be coupled to an electrode which abuts on the skin of the user, for example.

A response signal $S_r$ is received at an input 75 of the sensor circuit 34. The input 75 may be coupled to the same electrode as the output 74 or to a different electrode. The response signal $S_r$ may be pass through an isolating buffer 76 and one or several filters 77. An waveform detection device 78 may be configured to detect a waveform of the response signal $S_r$. The waveform detection device 78 may be configured to determine an envelope of the response signal $S_r$ as a function of time. Time dependent variations in capacitance and/or impedance and/or inductivity which are caused by the time-dependent variation of the probe frequency may be detected based on the envelope. Phase shifts between the response signal $S_r$ and the probe signal $S_p$ may be detected. The envelope information and phase shift may be processed by a digital control and processing unit 79 to determine a capacitance value for each one of a plurality of frequencies. The envelope information and phase shift may be processed by a digital control and processing unit 79 to determine an impedance or inductivity value for each one of a plurality of frequencies. The digital control and processing unit 79 may be an integrated circuit. The digital control and processing unit 79 may be a processor, a microprocessor, a controller, a microcontroller, an application specific integrated circuit or a combination of such devices.

Figure 8:
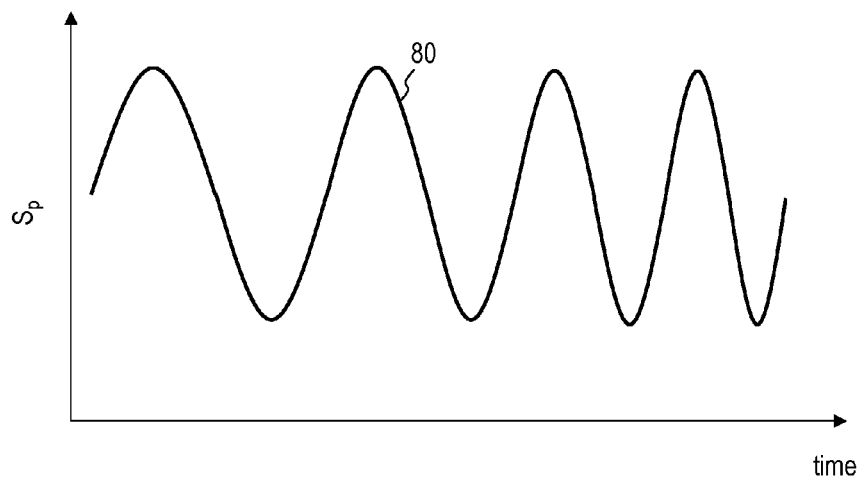
FIG. 8 is a diagram illustrating a frequency sweep for generating a probe signal by an electronic equipment according to an embodiment.

FIG. 8 shows a probe signal 80 which may be generated by the probe signal generation circuit 20 according to an embodiment. The probe signal 80 is generated by a frequency sweep. The frequency at which the probe signal 80 oscillates varies with time. The frequency may be changed in a continuous frequency ramp or discontinuously, for example.

Figure 9:
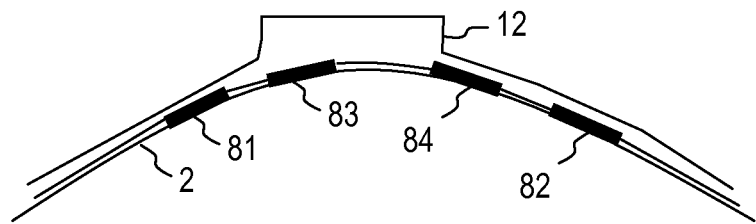
FIG. 9 is a cross-sectional view through a wearable device of an electronic equipment according to an embodiment.

Various measurement geometries may be used to apply a probe signal to the user and to capture the response signal from the user. For illustration, one-wire configurations may be used in which one electrode is used for applying the probe signal and for detecting the response signal. Other arrangements may be used, in which a current path passes through tissue of the user's body and the wearable device 12. In some implementations, four-point measurement techniques may be used in which a probe signal may be applied at a first pair of electrodes and the response signal may be detected at a second pair of electrodes, as illustrated in FIG. 9. Radio frequency (RF) four-probe impedance measurement techniques may be used. Both an impedance to ground and a through impedance may be measured. The probes may all be mounted in the same device or in different devices.

FIG. 9 shows a wearable device 12 applied to a user's skin 2. The sensor circuit may apply a probe signal, e.g. a voltage having a time-dependent frequency, at a pair of outer electrodes 81, 82. The voltage drop between another pair of inner electrodes 83, 84 may be detected as response signal. Frequency-dependent capacitive, inductive and/or impedance values may be computed from the response signal in combination with the probe signal.

The probe electrodes may also be mounted in different devices. For illustration, the electronic equipment may comprise electrodes mounted in a wearable device and other electrodes mounted in a handheld mobile device. The electronic equipment may be configured to measure both an impedance to ground and a through impedance through the user.

Figure 10:
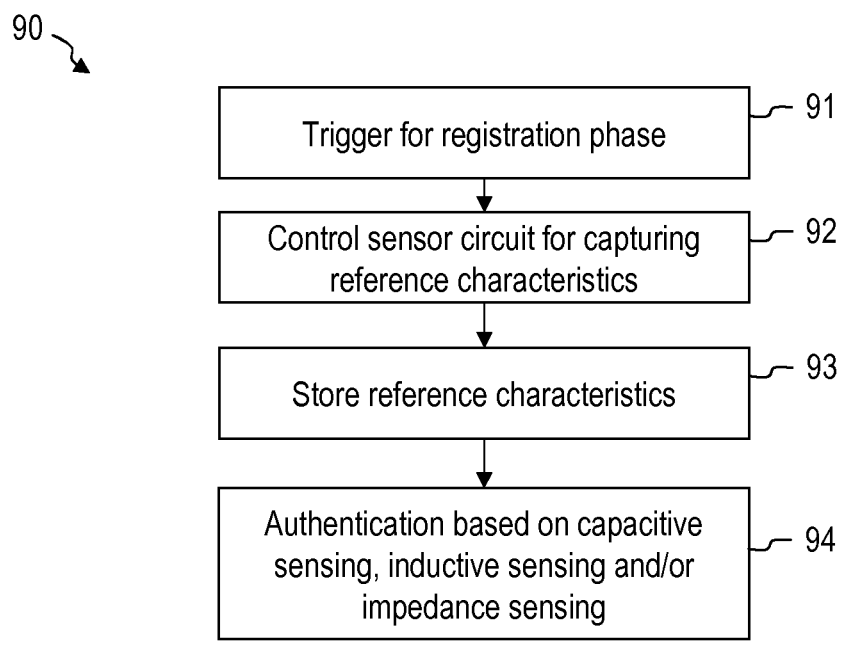
FIG. 10 is a flow chart of a method according to an embodiment.

FIG. 10 is a flow chart of a method 90 according to an embodiment. The method 90 may be performed by the electronic equipment according to an embodiment.

At 91, a registration procedure is triggered in which a electrical characteristics of a user may be stored in the electronic equipment. This allows the user to be authenticated based on the electrical characteristics and to perform an unlocking based on the electrical characteristics in later use. The trigger for the registration procedure may be the first start-up of the mobile device 11 and/or an unlocking of the device by password in combination with a user input which causes the registration procedure to be performed.

At 92, the sensor circuit is controlled to measure at least one electrical property of the user at a plurality of frequencies. The frequency-dependent electrical characteristics serve as reference characteristics of the user against which captured frequency-dependent electrical characteristics may subsequently compared to authenticate the user.

At 93, the reference characteristics may be stored. The reference characteristics may be stored in a non-volatile memory of the mobile device 11 and/or of the wearable device 12.

At 94, when the mobile device 11 is in a locked state, an authentication may be performed by capturing the frequency-resolved electrical characteristics of the user equipment and comparing them against the reference characteristics. When the frequency-resolved electrical characteristics captured for a user match the reference characteristics of one of the registered users, the mobile device 11 may be unlocked.

The reference characteristics may be captured and stored for a plurality of different positions of the electronic equipment relative to the user. For an electronic equipment which includes both a wearable device and a mobile device, the reference characteristics may respectively be captured and stored both for the case in which the wearable device and the mobile device are in contact with the same arm of the user and for the case in which the wearable device and the mobile device are in contact with different arms of the user. Steps 92 and 93 may be performed for a plurality of different positions of the electronic equipment relative to the user.

The reference characteristics may be automatically adapted by the electronic equipment when the electronic equipment detects that the frequency-resolved electrical characteristics which are measured at different times show consistent deviations from the stored reference characteristics. The electronic equipment may compute a weighted average of the stored reference characteristics and of the frequency-resolved electrical characteristics to compute updated reference characteristics, and may store the updated reference characteristics for subsequent use. This process may be performed whenever a user is authenticated or only after a pre-determined number of authentications. The reference characteristics may thereby be made to follow changes in the electrical properties of the user which may occur when the user grows, puts on weight or looses weight.

Figure 11:
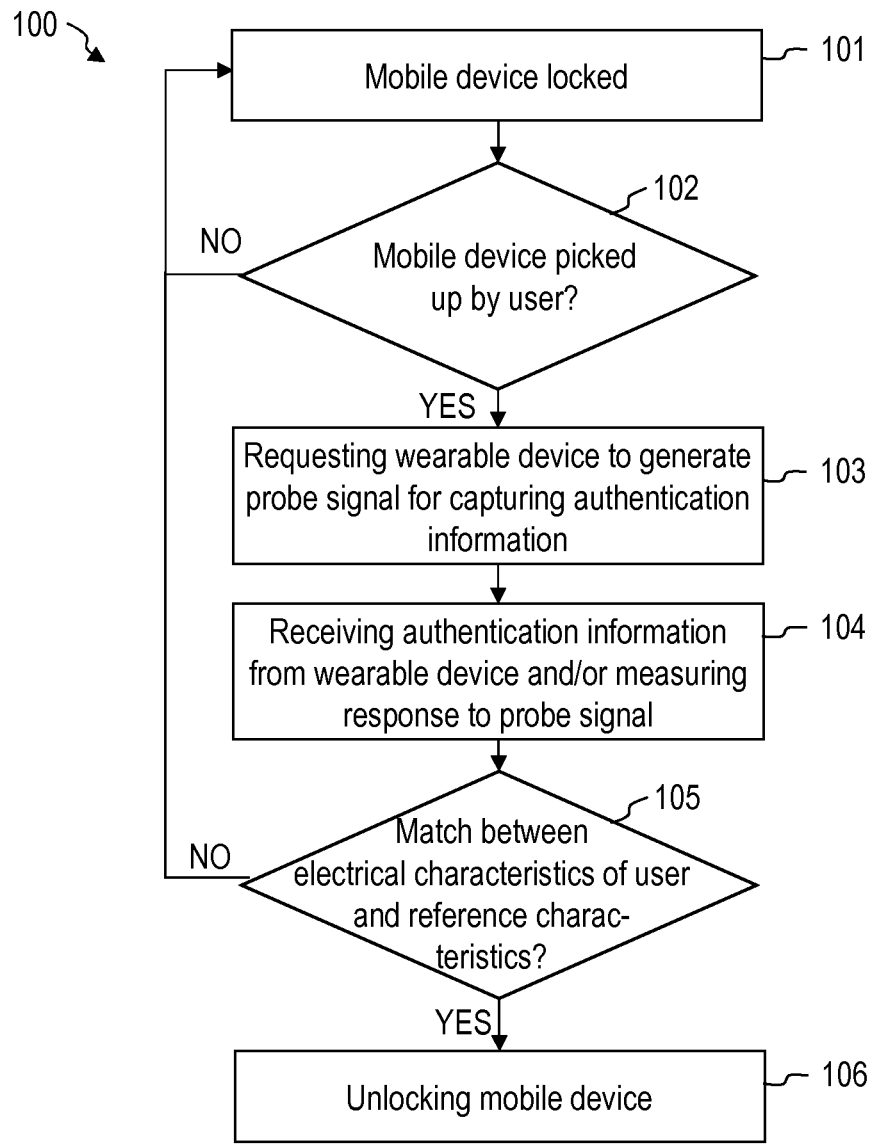
FIG. 11 is a flow chart of a method according to an embodiment.

FIG. 11 is a flow chart of a method 100 according to an embodiment. The method 100 may be performed by the electronic equipment according to an embodiment.

At 101, the mobile device is locked. In this state, a user interface of the mobile device may be in a locked state in which it prevents the user from performing at least some of the functions offered in the unlocked state. For illustration, the user may be prevented from initiating voice or data communication other than emergency communication.

At 102, it is determined whether the mobile device has been picked up. The mobile device may include a touch sensor and/or acceleration sensor to determine whether it has been picked up. When the mobile device has not been picked up, the mobile device may continue to operate in the locked state.

At 103, if the mobile device has been picked up, the wearable device may be requested to generate a probe signal. The mobile device may synchronize with the wearable device and may capture the frequency-resolved electrical characteristics of the user. Alternatively or additionally, the capturing of the frequency-resolved electrical characteristics and the comparison to the reference characteristics may be performed in the wearable device. In this case, the mobile device may request the wearable device provide authentication information. In response to the request from the mobile device, the wearable device may transmit the authentication information at 104. The authentication information may be a message which indicates whether or not the user is authorized to use the device, based on the comparison of the frequency-resolved electrical characteristics to reference characteristics. The mobile device and the wearable device may be paired with each other over a communication link, which may be a Bluetooth low energy link, a BAN link, or a another short range wireless communication link. The authentication information may include information on whether the frequency-resolved electrical characteristics captured for the user by the sensor circuit matches the reference characteristics of one of the users registered as authorized users with the electronic equipment. To this end, information on the reference characteristics may be stored in the wearable device in addition or as an alternative to storing it in the mobile device.

At 105, it is determined whether the frequency-resolved electrical characteristics captured for the user match the stored reference characteristics. If no match can be positively confirmed, the mobile device may remain locked and the method returns to step 101. As a fallback variant, the user may be requested to use other authentication techniques, e.g. password entry, if the authentication based on electrical characteristics fails.

At 106, if the frequency-resolved electrical characteristics captured for the user match the stored reference characteristics, the mobile device may be unlocked.

Modifications may be implemented in the electronic equipment according to embodiments. For illustration, it is not required that the electronic equipment includes a wearable device in addition to the mobile device. The sensor circuit may be integrated in the mobile device, together with the processing circuit. The processing circuit and the sensor circuit may also both be mounted in a wearable device.

FIG. 12 is a block diagram of an electronic equipment 110 according to an embodiment. The electronic equipment 110 is a mobile device having a housing, with a user interface 32, a processing circuit 30, a sensor circuit 34, and a reference data storage device 33 integrated in the housing.

The sensor circuit 34 may be operative to measure an impedance of a path through the user's body. The sensor circuit 34 may include the probe signal generation circuit 20. The sensor circuit 34 may be coupled to the user interface 32 and a further electrode provided separately from the user interface 32. The sensor circuit 34 may be configured to measure an impedance of a current path which flows out through the user interface when the user touches the user interface 32 with a finger, which flows through the user's arms and torso and back into the sensor circuit 34 via the further electrode. The sensor circuit 34 may be configured to measure the impedance for a plurality of frequencies, thereby capturing a footprint of the user which may be used for authentication.

A buffer 21 may also be integrated in the housing to buffer captured electrical characteristics. The sensor circuit 34 may be configured to repeatedly measure the at least one electrical property of the user and to buffer the captured frequency-resolved electrical characteristics in the buffer 21. When an unlocking operation is to be performed, e.g. when the user touches the user interface, the buffered frequency-resolved electrical characteristics may be retrieved from the buffer 21 for authentication. This may be done conditionally depending on whether the frequency-resolved electrical characteristics buffered in the buffer 21 have been captured within a pre-defined time interval preceding the unlocking operation. If the frequency-resolved electrical characteristics buffered in the buffer 21 have expired, a new measurement may be performed for authentication.

FIG. 13 is a schematic plan view of the electronic equipment 110 which is formed as a mobile device. The electronic equipment 110 may be a terminal of a cellular communication network. The user interface 32 has a surface 111 arranged at a first side 112 of the electronic equipment 110. The sensor circuit 34 is connected to the surface 111 and a further electrode 113 which is arranged at a lateral side 114 or a rear side of the electronic equipment 110. When the user holds the electronic equipment 110 in one hand and touches the surface 111 with a finger of the other hand, this may trigger the sensor circuit 34 to measure the impedance of a path through the user's arms and torso. The impedance measurement may be made at one or several frequencies. At least a modulus of the impedance may be determined as a footprint for authenticating the user.

An impedance measurement may also be performed using a wearable device, as will be illustrated with reference to FIG. 14.

FIG. 14 is a schematic cross-sectional view of a wearable device 12 of an electronic equipment according to an embodiment. The sensor circuit 34 is coupled to a pair of electrodes 81, 83. One electrode 81 may be kept in abutment on a skin 2 of an arm of the user by the wearable device 12.

The other electrode 83 may be exposed such that it can be touched by a finger 3 of the user. The sensor circuit 34 may be configured to measure an impedance of a current path which flows out through the electrode 83 when the user touches the wearable device 12 with the finger 3, which flows through the user's arms and torso and back into the sensor circuit 34 via the electrode 81. The sensor circuit 34 may be configured to measure the impedance for one frequency or a plurality of frequencies, thereby capturing a footprint of the user which may be used for authentication.

Figure 15:
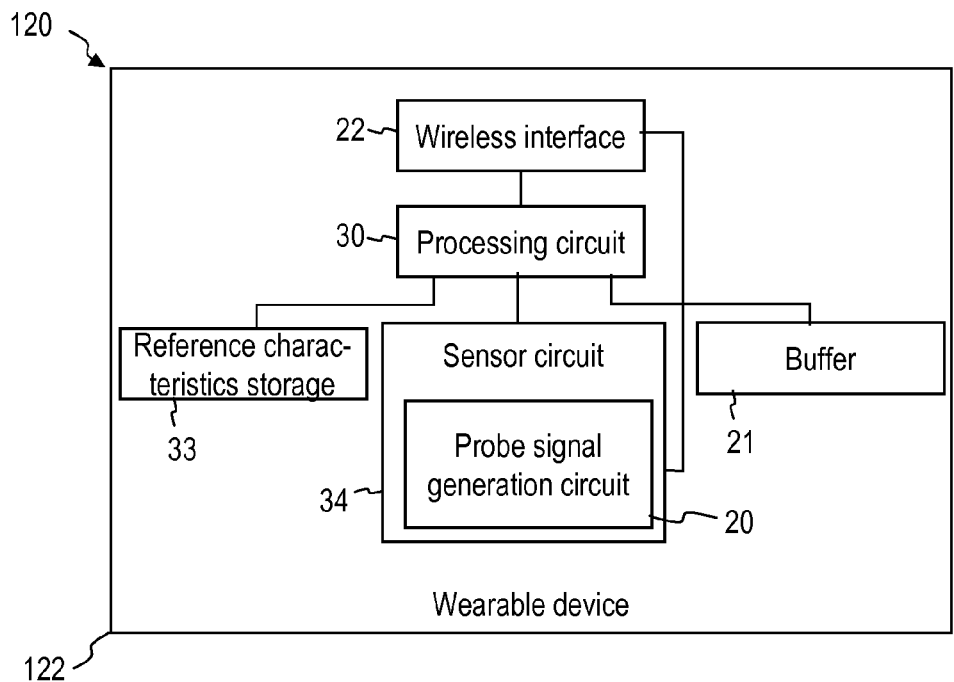
FIG. 15 is a block diagram of an electronic equipment according to an embodiment.
Figure 15:
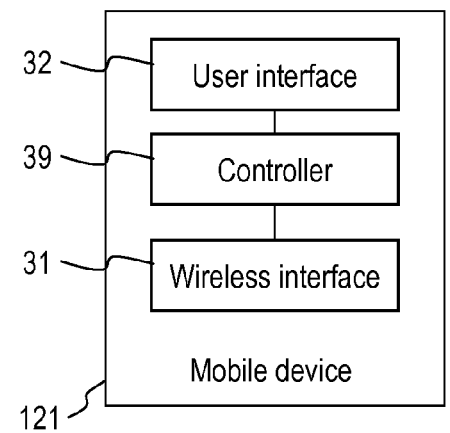

FIG. 15 is a block diagram representation of an electronic equipment 120 according to an embodiment. The electronic equipment 120 may include a mobile device 121 having a user interface 32. The electronic equipment 120 includes a wearable device 122. The wearable device 122 is configured to authenticate the user. The wearable device 122 includes a sensor circuit 34 for capturing frequency-resolved electrical characteristics of the user. The wearable device 122 includes a processing circuit 30 operative to compare the captured frequency-resolved electrical characteristics of the user to reference characteristics stored in a storage device 33 of the wearable device 122.

An authentication procedure may be triggered by the mobile device 121. The mobile device 121 may request the wearable device 122 to authenticate the user. The mobile device 121 may request the wearable device 122 to authenticate the user in response to detecting that the mobile device 121 has been picked up.

In response to the request, the wearable device 122 may determine based on the frequency-resolved electrical characteristics whether the user is authorized to unlock the user interface 32 of the mobile device 39. The wearable device 122 may transmit authentication information to the mobile device 121, with the authentication information indicating whether or not the captured frequency-resolved electrical characteristics match one of the reference characteristics.

If the wearable device 122 determines that the captured frequency-resolved electrical characteristics match one of the reference characteristics, a controller 39 of the mobile device 121 may unlock the user interface 32.

While the probe signal generation circuit 20 may be included in the wearable device 122 as shown in FIG. 15, the probe signal generation circuit 20 may also be included in the mobile device 121.

In the electronic equipments and methods according to embodiments, the electronic equipment may be configured to track changes in the footprint of a user. For illustration, the electrical characteristic measured for one and the same user by the sensor circuit 34 may change over time. However, such changes typically are slow. The electronic equipment may detect that, even though the captured electrical characteristics matches the recorded reference characteristics such that unlocking may be performed, there are consistent changes in the electrical characteristics. For illustration, the impedance or the capacitive values as a function of frequency may exhibit changes when the user puts on weight or looses weight.

The electronic equipment may be configured to detect and learn such changes in the electrical characteristics. The electronic equipment may monitor the electrical characteristics as a function of time, so as to change whether the footprint changes over time. The electronic equipment may be configured to update the reference characteristics when the electronic equipment has monitored and learned that the electrical characteristics undergo a consistent change.

The electronic equipments according to embodiments may take any one of a variety of different forms. The electronic equipment may be configured as a device which includes both the sensor circuit and the processing circuit. The device may further comprise a user interface or other lockable component. The electronic equipment may be configured as a set which includes both a handheld device and a wearable device.

Various effects are attained by the electronic equipments and methods according to embodiments. For illustration, a user who can be authenticated based on the electrical characteristics does not need to undergo steps of manually unlocking a mobile device. By using electrical sensing techniques, the authentication procedure may be implemented in a cost-efficient manner.

While exemplary embodiments have been described with reference to the drawings, modifications may be implemented in other embodiments. For illustration, the processing circuit which compares the captured electrical characteristics to the reference characteristics may also be integrated in the wearable device. Further, while exemplary communication technologies have been described for a communication between the mobile device and the wearable device, embodiments of the invention may be used in combination with other communication technologies.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

What is claimed is:

1. An electronic equipment, comprising:
   a sensor circuit operative to measure at least one electrical property of a user at a plurality of different frequencies to thereby capture frequency-resolved electrical characteristics of the user, said sensor circuit including
   an output for applying a probe signal to the user, and
   an input for receiving a response signal from the user in response to the probe signal,
   wherein said sensor circuit is configured
   generate the probe signal for application to the user, the probe signal comprising
   a) a plurality of signals, each of the plurality of signals oscillating at a different one of the plurality of different frequencies, or
   b) a signal that varies over the plurality of different frequencies, and determine the at least one electrical property based on the probe signal and the corresponding response signal; and
   a processing circuit operative
   to perform a comparison between the frequency-resolved electrical characteristics of the user and reference characteristics to authenticate the user, and
   to perform an unlocking operation based on a result of the comparison.

2. The electronic equipment of claim 1,
   wherein a probe signal generation circuit configured to generate the probe signal is mounted in a wearable device.

3. The electronic equipment of claim 2, further comprising
   a user interface which is separate from the wearable device and configured to communicate with the wearable device over a wireless interface,
   wherein the processing circuit is configured to selectively unlock the user interface based on the result of the comparison to perform the unlocking operation.

4. The electronic equipment of claim 3,
wherein the electronic equipment is configured to trigger the sensor circuit to capture the frequency-resolved electrical characteristics of the user when a housing accommodating the user interface is held in a hand of the user.

5. The electronic equipment of claim 3,
wherein the processing circuit is configured to transmit a trigger signal to the wearable device to trigger the probe signal generation circuit to generate the probe signal.

6. The electronic equipment of claim 3,
wherein the wearable device comprises a wireless interface,
wherein the processing circuit is mounted in the wearable device and is configured to transmit an unlocking signal over the wireless interface to unlock the user interface.

7. The electronic equipment of claim 1, further comprising
a user interface, and
a housing in which the user interface, the sensor circuit and the processing circuit are accommodated.

8. The electronic equipment of claim 7,
wherein the user interface is arranged on a first side of the housing and the sensor circuit comprises a conductive surface located at a second side of the housing, the second side being different from the first side.

9. The electronic equipment of claim 1,
wherein the electronic equipment is configured to capture the reference characteristics in a registration phase in which the sensor circuit measures the at least one electrical property of the user at the plurality of frequencies.

10. The electronic equipment of claim 9,
wherein the electronic equipment is configured to capture the reference characteristics in the registration phase for respectively each one of plural different positions of the electronic equipment relative to the user.

11. The electronic equipment of claim 1,
wherein the probe signal comprises a plurality of spectral components oscillating at different frequencies.

12. The electronic equipment of claim 1,
wherein the sensor circuit is configured to perform a swept frequency capacitive sensing, SFCS, to capture the frequency-resolved electrical characteristics of the user.

13. The electronic equipment of claim 1,
wherein the sensor circuit is configured to perform an impedance sensing to capture the frequency-resolved electrical characteristics of the user.

14. A method of authenticating a user of an electronic equipment, the method comprising:
measuring, by a sensor circuit, at least one electrical property of a user at a plurality of different frequencies to thereby capture frequency-resolved electrical characteristics of the user, said measuring including
generating, by a probe signal generation circuit mounted in a wearable device, a probe signal for application to the user, the probe signal comprising
a) a plurality of signals, each of the plurality of signals oscillating at a different one of the plurality of different frequencies, or
b) a signal that varies over the plurality of different frequencies, applying the probe signal to the user,
measuring a response to the probe signal determining the at least one electrical property based on the probe signal and the corresponding response signal;
performing a comparison between the frequency-resolved electrical characteristics of the user and reference characteristics to authenticate the user, and
selectively performing an unlocking operation based on a result of the comparison.

15. The method of claim 14, further comprising at least one of:
receiving a trigger signal for generating the probe signal at the wearable device over a wireless interface;
transmitting the result of the comparison from the wearable device to a mobile device over a wireless interface.

16. The method of claim 14, further comprising:
capturing, by the sensor circuit, the reference characteristics in a registration phase for subsequent use in authenticating the user.

17. The method of claim 14, wherein generating the probe signal comprises:
performing, by the sensor circuit, a swept frequency capacitive sensing, SFCS, to capture the frequency-resolved electrical characteristics of the user.

18. The method of claim 14,
wherein measuring the at least one electrical property of the user comprises:
performing, by the sensor circuit, an impedance sensing to capture the frequency-resolved electrical characteristics of the user.

* * * * *

UNITED STATES PATENT AND TRADEMARK OFFICE
CERTIFICATE OF CORRECTION

PATENT NO. : 9,510,197 B2  
APPLICATION NO. : 14/302456  
DATED : November 29, 2016  
INVENTOR(S) : Léon et al.

Page 1 of 2

It is certified that error appears in the above-identified patent and that said Letters Patent is hereby corrected as shown below:

In the Claims

Column 16, Lines 32-55 Claim 1 should read:

1. An electronic equipment, comprising:
   a sensor circuit operative to measure at least one electrical property of a user at a plurality of different frequencies to thereby capture frequency-resolved electrical characteristics of the user, said sensor circuit including
      an output for applying a probe signal to the user, and
      an input for receiving a response signal from the user in response to the probe signal,
   wherein said sensor circuit is configured
      generate the probe signal for application to the user, the probe signal comprising
         a) a plurality of signals, each of the plurality of signals oscillating at a different one of the plurality of different frequencies, or
         b) a signal that varies over the plurality of different frequencies, and
      determine the at least one electrical property based on the probe signal and the corresponding response signal; and
   a processing circuit operative
      to perform a comparison between the frequency-resolved electrical characteristics of the user and reference characteristics to authenticate the user, and
      to perform an unlocking operation based on a result of the comparison.

Column 18, Lines 5-25 Claim 14 should read:

14. A method of authenticating a user of an electronic equipment, the method comprising:
   measuring, by a sensor circuit, at least one electrical property of a user at a plurality of different frequencies to thereby capture frequency-resolved electrical characteristics of the user, said measuring including Signed and Sealed this  
Twenty-fifth Day of April, 2017

Michelle K. Lee  
*Director of the United States Patent and Trademark Office* generating, by a probe signal generation circuit mounted in a wearable device, a probe signal for application to the user, the probe signal comprising a) a plurality of signals, each of the plurality of signals oscillating at a different one of the plurality of different frequencies, or b) a signal that varies over the plurality of different frequencies, applying the probe signal to the user, measuring a response to the probe signal, determining the at least one electrical property based on the probe signal and the corresponding response signal, performing a comparison between the frequency-resolved electrical characteristics of the user and reference characteristics to authenticate the user, and selectively performing an unlocking operation based on a result of the comparison.